US005451923A

United States Patent [19]

Seberger et al.

[11] Patent Number: 5,451,923

[45] Date of Patent: Sep. 19, 1995

[54] COMMUNICATION SYSTEM AND METHOD

[75] Inventors: Stephen G. Seberger; Bruce F. Grumstrup; George W. Gassman, all of Marshalltown, Iowa

[73] Assignee: Fisher Controls International, Inc., Clayton, Mo.

[21] Appl. No.: 301,156

[22] Filed: Sep. 2, 1994

Related U.S. Application Data

[63] Continuation of Ser. No. 957,047, Oct. 5, 1992, abandoned.

[51] Int. Cl.[6] .......... H04M 11/04

[52] U.S. Cl. .......... 340/310.06; 340/310.01; 340/870.18; 375/257

[58] Field of Search ........ 340/310 CP, 310 R, 870.18, 340/310 A, 825.07; 73/168, 37, 4 R, 9, 862.32; 137/487.5, 486, 84, 85, 82; 364/558, 560, 556, 579; 375/5, 7, 24, 36; 179/81 R, 81 A; 370/85; 333/167, 127; 307/308, 261, 491, 494; 379/413, 98

[56] References Cited

U.S. PATENT DOCUMENTS

| | | | |
|---|---|---|---|
| 3,646,538 | 2/1972 | Frick . | |
| 3,651,454 | 3/1972 | Venema et al. . | |
| 3,702,460 | 11/1972 | Blose . | |
| 4,012,733 | 3/1977 | Whyte . | |
| 4,142,178 | 2/1979 | Whyte et al. . | |
| 4,325,399 | 4/1982 | Frick . | |
| 4,354,060 | 10/1982 | Niertit et al. . | |
| 4,481,967 | 11/1984 | Frick . | |
| 4,496,858 | 1/1985 | Smith . | |
| 4,520,488 | 5/1985 | Houvig et al. . | |
| 4,608,552 | 8/1986 | Boutonnat et al. . | |
| 4,613,848 | 9/1986 | Watkins . | |
| 4,633,217 | 12/1986 | Akano | 340/310 A |
| 4,646,771 | 1/1987 | Ochs . | |
| 4,665,938 | 5/1987 | Brown et al. . | |
| 4,722,360 | 2/1988 | Adajima et al. . | |
| 4,737,787 | 4/1988 | Ito et al. . | |
| 4,806,905 | 2/1989 | McGowan et al. | 340/310 R |
| 4,816,703 | 3/1989 | Sterling et al. | 340/310 R |
| 4,841,281 | 6/1989 | Melvin, Jr. | 340/310 A |
| 4,885,563 | 12/1989 | Johnson et al. | 340/310 A |
| 4,885,564 | 12/1989 | Varcellotti et al. | 340/310 A |
| 4,901,758 | 2/1990 | Cook et al. . | |
| 4,903,006 | 2/1990 | Boomgaard . | |
| 4,988,990 | 1/1991 | Warrior . | |
| 5,032,819 | 7/1991 | Sakuragi et al. . | |
| 5,109,692 | 5/1992 | Fitzgerald | 73/168 |
| 5,118,966 | 6/1992 | Kumada . | |
| 5,227,782 | 7/1993 | Nelson . | |
| 5,333,114 | 7/1994 | Warrior et al. . | |

FOREIGN PATENT DOCUMENTS

| | | |
|---|---|---|
| 0101528A1 | 2/1984 | European Pat. Off. . |
| 0244808A1 | 11/1987 | European Pat. Off. . |
| 3638493A1 | 5/1988 | Germany . |

*Primary Examiner*—Brent Swarthout
*Assistant Examiner*—Nina Tong
*Attorney, Agent, or Firm*—Marshall, O'Toole, Gerstein, Murray & Borun

[57] ABSTRACT

The present invention relates to a circuit which is connected by two-conductors to a control system for a variable analog DC input and that also enables bidirectional digital communication along the two conductors for diagnostic operations of an instrument. The novel circuit includes a switch circuit that has a first position that provided the ability to accept both the variable DC analog signals and the bidirectional digital communication signals by presenting a first impedance for the DC signals and a second switch position for providing a second substantially higher impedance while using the same two-conductor system. The novel invention also includes an auxiliary analog input signal to the circuit which allows further control as a current feedback to a control algorithm in a microcontroller. An auxiliary process transmitter can sense pressure, temperature, flow or some other process related variable and couple it to the circuit for control of the instrument. Finally, the novel invention includes a novel voltage regulator and a capacitive voltage supply for utilizing the voltage on the two conductors from the controller to also power the device.

42 Claims, 4 Drawing Sheets

COMMUNICATION SYSTEM AND METHOD

This is a continuation of application Ser. No. 07/957,047 filed on Oct. 5, 1992, now abandoned.

BACKGROUND OF THE INVENTION (1) Field of the Invention

The present invention relates to a communication system and method for use in an industrial process that enables signals to be transmitted to and received from a controlled device and specifically relates to a novel electro-pneumatic instrument that receives both power and analog control signals on a single pair of conductors while also communicating digitally with the control system in a bidirectional manner on the same single pair of conductors.

(2) Description of Related Art

It is well known in industrial systems to use transducers, also called I-to-P transducers and positioners to respond to control signals for controlling the position of a valve or the like. These devices are typically powered by and receive their control signals via a single pair of conductors. These signals generally range from 4–20 milliamps DC. A maximum operating voltage is usually no more than 12 volts DC at the terminals of the device. The combined current and voltage limitations are often driven by the need to use these instruments in hazardous area where only intrinsically safe energy levels may be present.

Many devices that meet these requirements exist but most are analog in nature and do not possess the ability to transmit or receive digital information to and from other devices. For example, the Rosemount 3311 device superimposes a variable frequency on the conductor pair as a means of communicating information unidirectionally. Another example is disclosed in U.S. Pat. No. 4,633,217. The device disclosed in that patent digitally transmits information. The device disclosed in U.S. Pat. No. 4,633,217 is capable of digital transmission only. It does not receive any signals other than the 4–20 milliamp analog signal.

There are other transducer or positioner devices that communicate bidirectionally, but not via the same single pair of conductors that carry 4–20 milliamp power and the control signal. There are also many process transmitters that have the primary function of sensing process conditions rather than providing control. These devices control the 4–20 milliamp current rather than receiving it and many do communicate digitally via the same conductor pair. However, none of the control devices in the prior art utilizes a single pair of conductors to receive power and a 4–20 milliamp current control signal while also transmitting digital information to and receiving digital information from the control system.

It is important to note that transmitters control the loop current in the single pair of conductors as a normal part of their operation. Controlling the loop current independent of the DC terminal voltage of the device is equivalent to having a high DC impedance. Such a device inherently allows modulation of the loop voltage and can easily be paralleled with a like device without fundamental changes in its interface circuitry. However, for a control device to communicate with another device such as a process control system requires a novel impedance characteristic not present in transmitters. Also, paralleling of multiple control devices when communicating with a process control system requires that the impedance be able to be changed or switched to one similar to that of the transmitters.

In order for a transducer or positioner to have a sufficiently low maximum DC terminal voltage at 20 milliamps loop current and have enough power available to run a microprocessor circuit at 4 milliamps, it must have a low or negative impedance at low frequencies. In order for such a device to communicate digitally in both directions with one or more other devices, it needs to have a relatively high impedance at the communication frequencies. In order for the communication signal, which carries multiple frequency components, not to be distorted substantially, the instrument's impedance must be very high or essentially flat over the communication frequency band.

Voltage headroom is a significant technical obstacle when designing digital devices to operate under the voltage and current restrictions stated previously and still communicate digitally over the same single pair of conductors. The microprocessors have typically required 5-volt power at several milliamps. The power requirements of other circuitry can also be significant, particularly in the case of transducers and positioners where an electro-pneumatic output must be driven to perform the basic instrument function.

Although the total current required in the device usually exceeds 4 milliamps, the device itself needs to operate on 4-milliamp loop current and thus it is necessary to provide an efficient step-down power conversion in the power supply circuitry of such devices. Step-down conversion can be implemented in three basic ways. First, by linear series regulation; second, by inductor switching; or, third, by capacitor switching. Series regulation is simple and inexpensive but is very inefficient. Analog instruments are able to implement this type of regulation because of a much lower overall power requirement. Inductor switching is quite common and versatile in that it can be used to convert virtually any voltage to any other voltage. This type of conversion generates magnetic and electrical switching noise that may be undesirable and generally cannot achieve efficiencies greater than about 85 percent. Capacitor switching can be greater than 90 percent efficient and relatively quiet, but has the restriction of converting voltages in integer steps. As an example, the prior art 7660 switched capacitor voltage converter can be used only to invert, double or halve the input voltage.

The 5-volt logic of prior art could not employ switched capacitor voltage conversion because the requirement for 10-volt input to the converter could not be met and still leave enough voltage headroom for impedance control and modulation transmission without exceeding a 12 VDC terminal voltage requirement.

SUMMARY OF THE INVENTION

The present invention maintains the application advantages of the common 4-to-20 milliamp controlled transducer or positioner with the use of a single pair of conductors that supplies the power to the transducer or positioner while also allowing digital communication bidirectionally via the same single pair of conductors.

The transducer or positioner can be sent a multiplicity of digital instructions to change its operating parameters where noncommunicating devices would need to be physically removed, recalibrated or locally manipulated in some manner to achieve the change in operating parameters.

Further, the transducer or positioner can communicate a multiplicity of parameters about itself and its environment to other devices connected to the same single pair of conductors thereby improving the integrity of the control loop and fulfilling the function of several instruments.

By utilizing the same single pair of conductors, the instrument of the present invention can be used as a replacement for analog instruments without the need to install additional conductors. The instrument can be used in intrinsically safe installations where higher powered devices cannot. Further, digital signals can be used to communicate with the instrument on a remote basis with the same pair of conductors that power the device.

Thus, it is a feature of the present invention to provide a novel instrument that is both powered and controlled with a 4–20 milliamp control signal over a single pair of conductors while digitally communicating bidirectionally with other devices, such as process control systems or other communication terminals, via the same pair of conductors.

It is also a feature of the present invention to provide a novel instrument that has a low impedance for the 4-milliamp DC control signals and relatively high impedance for bidirectional digital communication with one or more devices at the communication frequencies.

It is still another feature of the present invention to provide an auxiliary current sensor as a part of the instrument that can sense an auxiliary current controlled by a transmitter sensing pressure, temperature, flow or some other variable and transmitted on a second pair of conductors to the communication instrument. One use of this auxiliary signal is to sense a process feedback signal that is compared with a commanded setpoint signal in a process control algorithm and the resulting output used as a setpoint to a servo-algorithm whose output is used to control an electro-pneumatic device function such as changing pressure or position. This is accomplished while allowing the receiving or transmitting of digital communication from a control system or other communications terminal over a first pair of conductors simultaneously with the power for the device over the first pair of conductors.

Thus, the present invention provides a system for communicating between a control system or communication terminal and a remote electro-pneumatic instrument that controls an actuator to cause it to perform a task, the system comprising a single pair of first and second conductors coupled between the control system and the remote instrument for carrying variable analog DC control signals to the remote instrument to cause the remote instrument to perform a selective task with the actuator, and enabling bidirectional digitally encoded communication signals concerning supplemental data to be transmitted between the instrument input terminals and the control system or other communication terminal over the same single pair of first and second conductors.

The invention also relates to an instrument capable of communicating with a control system or other communication terminal through only two conductors from a remote location with digital and DC control signals and able to drive an actuator, the instrument comprising first and second input terminals for receiving 4–20 milliamp variable DC analog control signals on the two input terminals, circuit means for receiving the DC input control signals and generating actuator drive signals that are coupled to the actuator as a function of the input DC control signals, circuitry for receiving actuator condition signals from the actuator, converting them to digital signals and coupling the digital signals to the first and second terminals for transmission to the remote control system or terminal on the single pair of conductors and further receiving digital command signals from the remote control system or terminal through the same two conductors and generating command signals to the actuator.

The invention also relates to a voltage regulator comprising a substantially constant voltage node having a voltage, $V_N$, on a first conductor with respect to a second conductor, an operational amplifier having first and second inputs and an output, a series coupled resistor and zener diode coupled across the first and second conductors to provide a reference voltage to the first input of the operational amplifier, first and second series connected resistors, $R_1$ and $R_2$, connected across the single pair of first and second conductors and coupling the voltage across the second resistor, $R_2$, to the second input of the operational amplifier to provide a voltage that varies with the voltage at the substantially constant voltage node, a transistor having a base, emitter and collector with the emitter and collector coupled across the single pair of first and second conductors, and the output of the operational amplifier being coupled to the base of the transistor such that the voltage at the substantially constant voltage node is regulated according to the equation $$V_N = V_R \times [1 + (R_1/R_2)]$$

The invention further relates to a switched capacitor voltage converter for receiving a fixed regulated DC voltage, $V_{REG}$ and providing an output voltage $V_{REG/2}$ and $-V_{REG/2}$ for providing power to the circuit elements.

The invention also relates to a circuit that is coupled to a single pair of first and second conductors for controlling the impedance of the circuit presented to the single pair of conductors, the circuit, the circuit comprising a variable impedance element coupled in series with the first input conductor and impedance control means coupled to the variable impedance element for causing the element to present a first acceptable impedance to the single pair of conductors in response to a first signal and to present a second substantially higher impedance to the single pair of conductors in response to a second signal.

BRIEF DESCRIPTION OF THE DRAWINGS

These and other objects of the present invention will be more clearly understood when taken in conjunction with the following DETAILED DESCRIPTION OF THE DRAWINGS in which:

FIG. 7 is a block diagram of the present invention including an auxiliary analog input signal from a second pair of conductors for input of a process variable such as pressure, temperature, flow and the like;

DETAILED DESCRIPTION OF THE DRAWINGS

The present invention is basically used for remote control of an actuator device over a single pair of conductors from a remote distance. The invention can be either a positioner or a transducer. A positioner is defined as a device which takes a primary electrical signal and translates it into a position or movement. The term "transducer", in the industrial system to which this invention relates, generally refers to a device that takes a primary signal and changes it to a quantity such as a pressure. Since the present invention pertains to both a positioner and a transducer, Applicant will use throughout the specification the term instrument, for simplicity, but it is to be understood that the term instrument is used herein as both a positioner and a transducer as defined herein.

Figure 1:
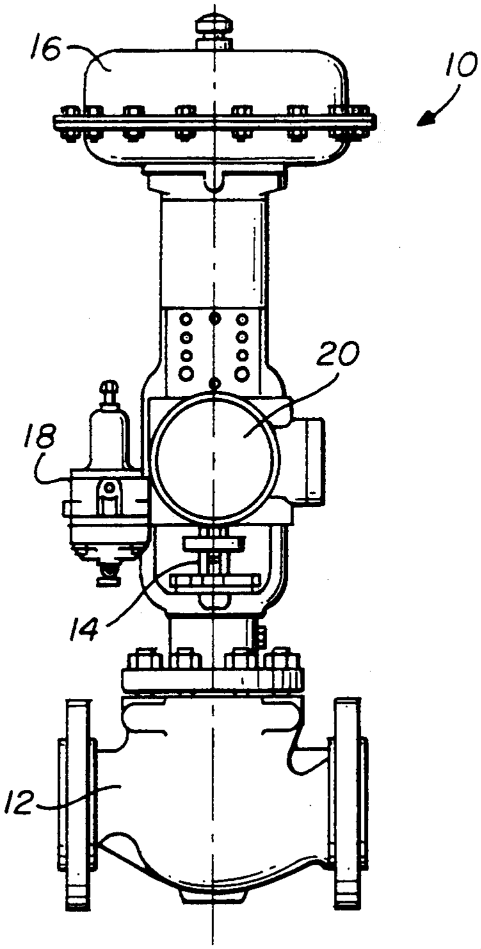
FIG. 1 is a front view of a diaphragm actuated control valve that can be controlled by the present invention.
Figure 2:
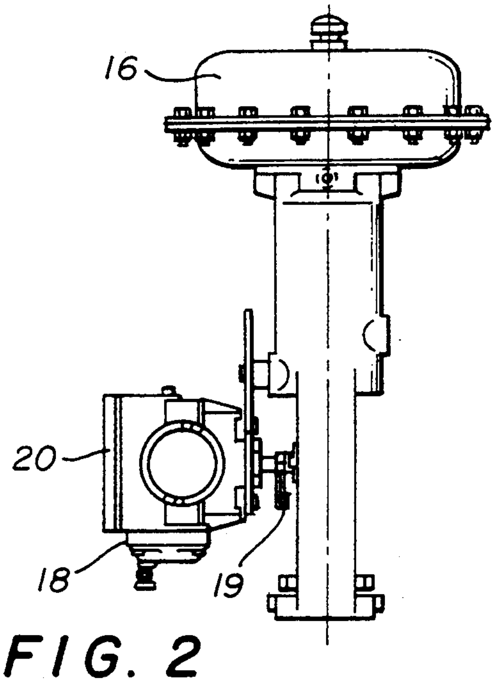
FIG. 2 is a side view of the pneumatic actuator and instrument portions of the control valve of FIG. 1.
Figure 3:
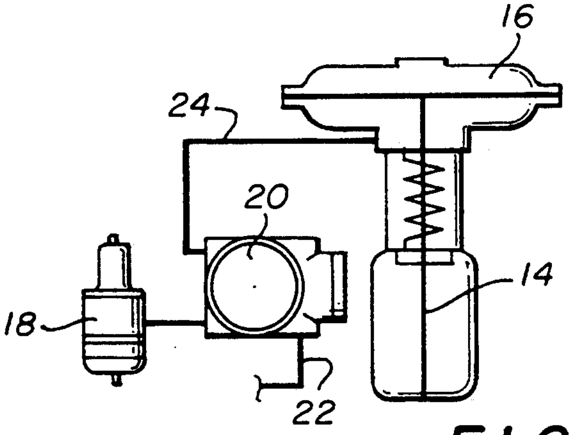
FIG. 3 is a schematic drawing of the control of the pneumatic actuator instrument of FIGS. 1 and 2.

A plan view of a diaphragm actuated control valve 10 is shown in FIG. 1. The actuator 16 includes a rod 14 that controls the valve unit 12. Pressure within actuator 16 forces the rod 14 to move against a spring (illustrated schematically in FIG. 3) to position the valve in valve unit 12 in a well-known manner. A source of fluid pressure 18 is coupled through instrument 20 to actuator 16 to move the rod or stem 14. An instrument 20 is mounted on the body of the actuator 10 and accepts a feedback linkage 19, shown in FIG. 2, that is coupled to the rod or stem 14 to generate a feedback signal to indicate the response of the unit to an applied signal. As can be seen in FIG. 3, a 4–20 milliamp DC signal is applied from a remote control system through a single pair of conductors to the instrument 20. The signal is converted by means in the instrument 20 to allow more or less fluid pressure from a supply 18 to be coupled through control line 24 to the actuator 16 to move rod or stem 14. The feedback is then coupled by feedback linkage 19 to the instrument to indicate movement of the valve to the appropriate position commanded.

Figure 4A:
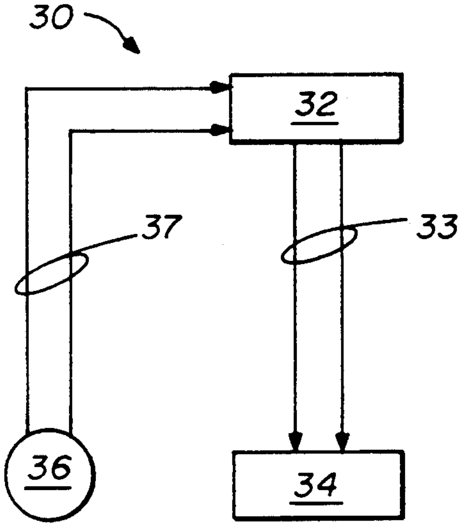
FIG. 4A PRIOR ART
FIG. 4A is a diagrammatic representation of a prior art control system operating a positioning device such as the control valve of FIG. 1.

FIG. 4A illustrates a prior art system for operating such a valve. The instrument 34 receives command signals from a remote controller 32 through a single pair of conductors 33. The control signal is typically a 4–20 milliamp DC signal having a voltage sufficient to supply a minimum required voltage at the input to the terminals of instrument 34. When controller 32 sends the variable DC signal to the instrument 34, it operates the transducer and subsequently the valve to move an amount commanded by the 4–20 milliamp DC signal. A sensor 36 generates feedback signals on the single pair of conductors 37 which are coupled back to the control system 32. Thus the controller infers from process feedback when the instrument 34 has responded properly to the command signals. The signals used herein and developed herein are analog in nature and do not allow any other communication by the instrument 34 to the control system 32. It would be advantageous to be able to ask the instrument for additional operational data on pressure, position, temperature, or some other related variable. For instance, it may be desirable to know the temperature of the instrument. It may also be desirable to know the fluid output pressure at the instrument. It may also be desirable to know the flow rate through the valve that has been controlled or the pressure in the fluid line which is controlled by the valve. Obviously, other process related variables are important and would be important to know during the operation of the system.

Figure 4B:
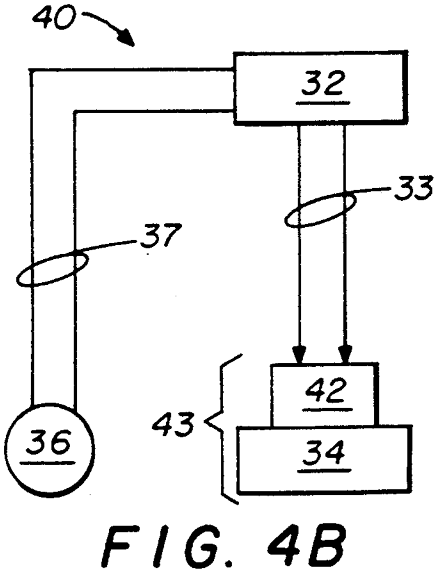
FIG. 4B is a diagrammatic representation of the control system of the present invention that utilizes both DC current and digital data in a circuit to control a valve instrument such as a transducer or the positioner disclosed in FIG. 1.

The present invention provides such a device with the use of a circuit illustrated in FIG. 4B. This circuit is essentially identical in the overall configuration to the circuit of FIG. 4A except that a communication and control circuit 42 has been included with an operating device 31 such as a transducer, for example only, to provide an instrument 43 that enables digital command signals to be received from the control system 32 on the single pair of conductor 33 and to return digital signals representing operational data to the control system 32 on the same pair of conductors 33. Thus the novelty of the circuit in FIG. 4B is to maintain the application advantages of the common 4–20 milliamp DC controlled instrument 34 while also allowing digital communication bidirectionally with the control system and the instrument 43 through the same single pair of conductors 33. Thus with this circuit, the instrument 43 can be sent a multiplicity of digital instructions to report its operating parameters or to change its calibration and/or configuration where noncommunicating devices would need to be physically removed, recalibrated or locally manipulated in some manner to achieve the result. The circuit in FIG. 4B can be used to communicate a multiplicity of information data about the instrument 43 itself and its environment to other devices connected to the same conductor pair thereby improving the integrity of the control loop and fulfilling the function of several instruments. Therefore, by replacing the analog instrument 34 in FIG. 4A with the instrument 43 in FIG. 4B, the instrument 43 can be used as a replacement for prior art analog instruments without the need to install additional conductors, can be used in installations where separately powered devices cannot, and can receive remotely generated communications using the same pair of conductors that power it. Thus, the circuit in FIG. 4B provides a system for communicating between a control system and the input terminals of a remote instrument 43 that controls an actuator to cause it to perform a task. The system comprises a single pair 35 of first and second conductors coupled between the control system 32 and the remote instrument 43 for carrying variable analog DC control signals to the instrument 43 to cause the instrument 43 to perform selective tasks with the actuator device. The instrument 43 is coupled to the single pair of first and second conductors 35 for receiving the variable analog DC control signals and simultaneously enabling bidirectional digitally encoded communication signals concerning supplemental instrument data to be transmitted between the instrument input terminals and the control system over the same single pair of first and second conductors.

Figure 5:
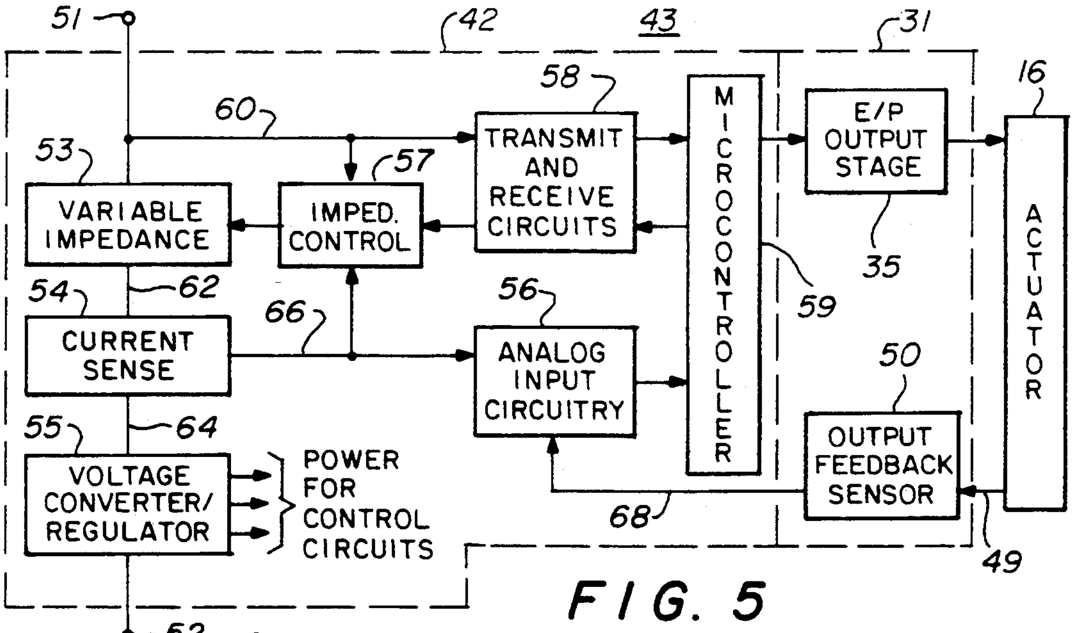
FIG. 5 is a block diagram of the circuit of the present invention for receiving control signals on a single two-conductor input, providing output control signals to an electro-pneumatic driver for the positioner or transducer and receiving feedback signals for the positioner or transducer.

FIG. 5 is a block diagram of the novel instrument 43 coupled to the actuator 16. As can be seen in FIG. 5, the communicating instrument 43 includes the elements represented by the block diagrams within the dashed lines 31 and 42. The two input terminals 51 and 52 represent the instrument terminals that receive the 4–20 milliamp DC signals on the single conductor pair 33. In order for the instrument 34 to have a terminal voltage at or below an acceptable DC level at 20 milliamps loop current and to have enough power available to run a microprocessor circuit at 4 milliamps, the electro-pneumatic output stage 35 must have a low power consumption. In order for the instrument 43 to communicate digitally in both directions with one or more devices, the communication circuit 42 must have a relatively high impedance at the digital communication frequencies. Further, in order for the digital communication signal, which carries multiple frequency components, not to be distorted substantially, the impedance of the communication circuit 42 must be very high or essentially flat over the communication frequency band.

To meet these objectives, the invention comprises a variable impedance line interface circuit that maintains a low impedance at frequencies below 25 Hz to accommodate 4–20 milliamp analog signal variations without substantial terminal voltage fluctuation while also maintaining a substantially higher and relatively constant impedance across the 500–5000 Hz frequency band used for the digital communications.

In FIG. 5, terminals 51 and 52 comprise the main terminals of the communication circuit 42 to which the 4–20 milliamp loop formed by the single pair of conductors 33 is connected. Variable impedance element 53 regulates the total current drawn by the instrument 43 to maintain the required impedance. The characteristics of the impedance control circuit 57, which monitors the voltage of terminals 51 and 52 and the current sensing element 54, determine the apparent device impedance. Since the terminal impedance at communication frequencies is substantial, communication signals from other devices can be extracted by the transceiver circuits 58 simply by monitoring and filtering the voltage on terminals 51 and 52 through line 60. The transceiver circuits 58 can readily transmit information by modulating the impedance control circuit 57 which in turn controls the variable impedance element 53 to affect the terminal voltage and, to a lesser degree, the loop current. As is well known in the art, the effect of digital transmission on loop current will be determined by the impedance of the network and other devices on the network.

The current sensing element 54 is used additionally by analog input circuitry 56 to monitor the loop current for extraction of the DC analog signal value for use as a control parameter. As an additional function of the circuit, the analog input circuitry 56 can monitor one or more sensors such as output feedback and other physical properties. To receive and operate on digital communications, and to carry out the primary function of the communication circuit 42, the invention incorporates a microprocessor or microcontroller circuit 59 interfaced to the analog circuitry 56 and the transceiver circuits 58 as well as to an electro-pneumatic output stage 35. Many prior art microcontrollers, such as microcontroller 59, transceivers such as transceiver 58 and analog input circuits 56 are well known in the art and will not be described in detail herein. Further, the electro-pneumatic output stage 35 for a transducer and feedback sensor 50 are also well known in the art as disclosed in relation to FIG. 1.

The variable impedance device 53 maintains a low impedance at frequencies below 25 Hz to accommodate the 4–20 milliamp DC analog signal variation without substantial terminal voltage fluctuation and also maintains a substantially higher and relatively constant impedance across the 500–5000 Hz frequency band used for digital communications. The impedance control circuit 57 causes the variable impedance 53 to provide the impedance characteristic needed. The current sense element 54 is used by the analog input circuitry 56 to monitor the loop current for extraction of the analog signal value for use as a control parameter. As will be seen hereafter, as an additional function of the instrument, the analog input circuitry 56 can monitor one or more other sensors such as output feedback signals or signals representing other physical properties.

The voltage converter/regulator 55 provides the power for the control circuits as indicated.

Thus the invention disclosed in FIG. 5 includes a transceiver 58 coupled to the impedance control circuit 57 and to the single pair of conductor terminals 51 and 52 for receiving the digital communication signals from the controller on the single pair of conductors at substantially higher frequencies than the DC signals. The transceiver 58 and the microcontroller 59 can decode, filter, buffer, demodulate, accumulate and/or convert the digital information on the single pair of conductors. The transceiver 58 transmits digital information to the control system 32 by processing the digital signals to provide parallel-to-serial conversion, modulation and wave shaping as needed and coupling the digital signals to the impedance control circuit 57. The impedance control circuit 57 controls the impedance of variable impedance element 53 to affect the terminal voltage and possibly the loop current of the single pair of conductors coupled to terminals 51 and 52 for both the variable DC and the second substantially higher band of frequencies. Further, current sense element 54 is coupled in series with one of the single pair of conductors. Analog circuit 56 is coupled to the current sense element 54 to extract the DC analog control signal from the single pair of conductors to provide the desired output signal to the microcontroller 59. Electrical conductors 68 couple actuator feedback signals to the analog input circuitry 56 for monitoring physical properties of the actuator such as pressure or position. The microcontroller circuit 59 is coupled to the analog input circuit 56 and the transceiver 58 to receive the DC analog control signals on the single pair of conductors and to receive the digital communication signals on the single pair of conductors at a second band of substantially higher frequencies and transmits digital communication signals on the single pair of conductors representing the physical properties of the actuator and other information, e.g. serial number, tag-number, etc.

Figure 6:
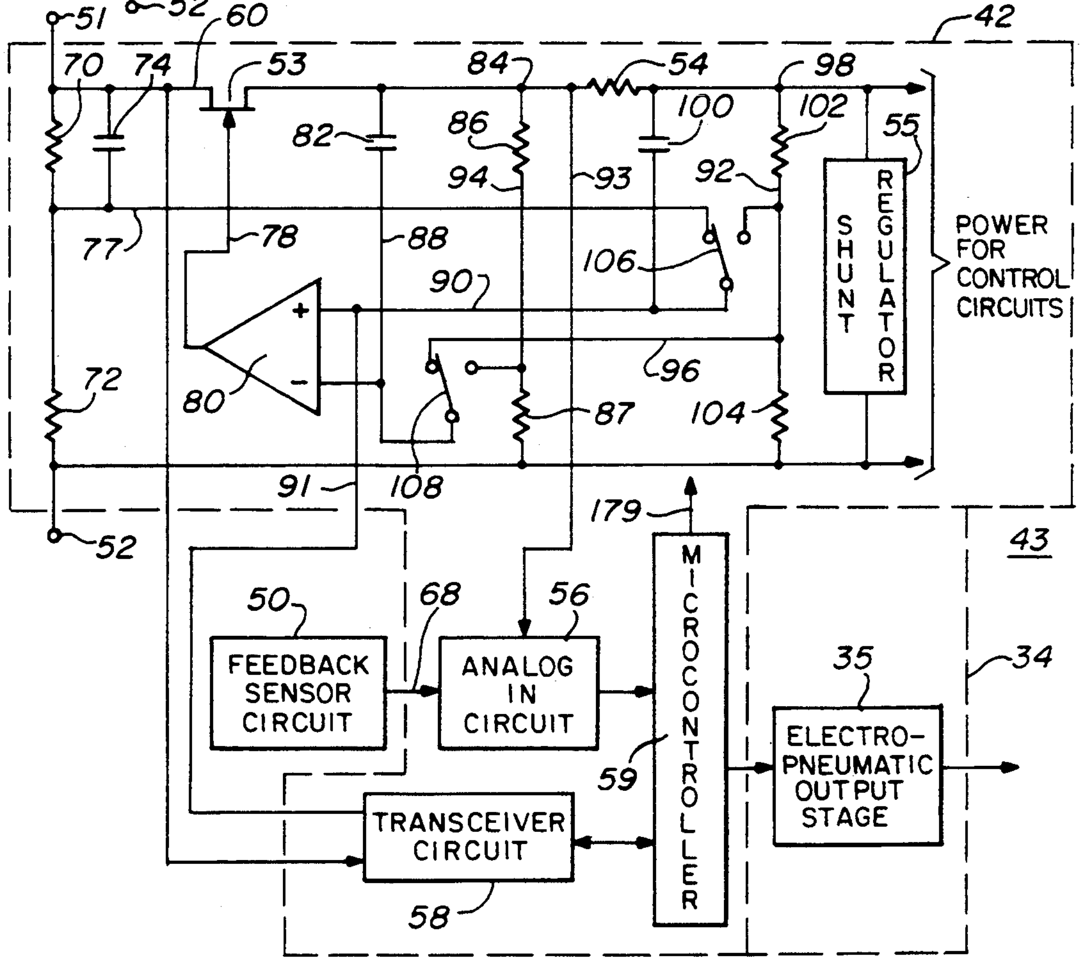
FIG. 6 is a detailed diagram of a portion of the circuit of FIG. 5.

FIG. 6 illustrates a more detailed circuit of an embodiment of the present invention. The 4–20 milliamp DC variable analog signal and the digital signals from the controller 32 as illustrated in FIG. 4B are coupled on the single pair of conductors 33 to input terminals 51 and 52. The signal on line 60 is coupled to a semiconductor element such as an N-channel FET 53 having input, output and control terminals formed with its drain, source and gate terminals, respectively. FET 53 is the variable impedance element that will provide the desired instrument impedance characteristic when appropriately controlled. One skilled in the art will recognize that other types of transistors or semiconductor combinations can be substituted for many elements of the circuits described. Operational amplifier 80 is an impedance control device whose output is coupled on line 78 to the control terminal or gate of FET 53 to provide the desired impedance characteristic as will be discussed hereafter.

The output of the N-channel FET 53 is coupled on line 84 to a resistor 54 which is the current sense element illustrated in FIG. 5. This current sense element 54 provides the current sensing function for impedance control as well as for the sensing of the 4–20 milliamp DC analog signal. Alternatively, separate current sense elements can be used to provide signals for these two functions. The output of the current sensing element 54 at node 98 is coupled to a shunt regulator 55 coupled between node 98 and common input line 52. Shunt regulator 55 is the internal power supply voltage regulator. It provides a substantially constant voltage at node 98 with respect to line or node 52 over the full range of loop current and with a varying current load from other connected circuitry. Any excess current flowing in the loop, not required for powering the control circuitry, is shunted by this element as will be seen hereafter. The function of this device could also be provided by other common circuits such as a zener diode, a commonly available shunt regulator integrated circuit, a transistor circuit or an operational amplifier circuit.

The impedance control circuit 57 comprises components as follows: resistors 70 and 72, capacitors 74, operational amplifier 80, capacitor 82, resistors 86 and 87, capacitor 100, resistors 102 and 104 and single-pole double-throw switches 106 and 108. To understand this circuit, the DC or steady-state function is analyzed with the switches 106 and 108 in the position indicated by the solid line. Eliminating the capacitors from the circuit for DC analysis, it can be seen that amplifier 80 will manipulate the gate voltage of the N-channel FET 53 to maintain the following relationship:

$$V_{51}-V_{52}=[V_{98}-V_{52}]\times[R_{104}/(R_{102}+R_{104})]\times[1-+(R_{70}/R_{72})]$$

This analysis assumes the values of $R_{70}$, $R_{72}$, $R_{102}$ and $R_{104}$ are chosen to allow sufficient voltage drop across N-channel FET 53 so as to prevent its saturation.

The analysis also shows that the DC average terminal voltage of the device will be constant which equates to a very low DC impedance, the advantages of which were discussed earlier. It can be seen that non-zero DC impedance will result from additional impedance elements in series with the circuit shown and from the limited gain of the control elements.

The addition of capacitor 82 to the circuit causes the impedance of the device to rise with increased frequency because it couples the voltage across the current sense resistor 54 into the impedance control amplifier 80 in such a way so as to oppose changes in the input signal or loop current. This increase in device impedance at higher frequencies is necessary to facilitate digital communication among multiple connected devices. The addition of capacitor 100 coupled between the substantially constant voltage caused by voltage regulator 55 and the differential amplifier 80 on line 90 and the addition of capacitor 74 between input terminal 51, coupled to one of the single pair of conductors, and the input to amplifier 80 on conductor 90 causes the impedance to level off at a relatively fixed value above a predetermined cut-off frequency. This leveling of the impedance characteristic is targeted for the digital communication frequencies and is necessary to limit communication signal distortion. As shown in FIG. 6, two single-pole double-throw switches 106 and 108 are used to change the impedance characteristic of the circuit from a special characteristic with very low DC impedance and relatively high communication frequency impedance to a constant high impedance regardless of frequency. These switches may be electrical switches of a type well known in the art that are manually preset or could be electronic switches operated by signals from the microprocessor 59 on line 179. This alternate impedance characteristic is necessary to allow the instrument to be used in parallel with several other loop powered devices where the current drawn by each is limited and relatively constant rather than being varied as an analog signaling means.

Thus, the N-channel FET 53 forms the variable impedance element and is coupled in series with the first input conductor 51 with its gate coupled to the differential amplifier 80 that receives its input signals through switches 106 and 108 to form an impedance control means coupled to the variable impedance element 53 for causing the variable impedance element to present a first acceptable impedance to the single pair of conductors coupled to terminals 51 and 52 in a first frequency range below 25 Hz and to present a second substantially higher impedance to the single pair of conductors in a second frequency range of 500–5000 Hz. A first voltage divider network comprising series connected resistors 102 and 104 is connected across the terminals 51 and 52 at node 98 that has the substantially constant regulated voltage across it. A first voltage is generated on node 92 that represents a predetermined portion of the regulated voltage at node 98 and is coupled through switch 108 to the negative input of the differential amplifier 80. A second voltage divider comprised of series connected resistors 70 and 72 is connected across the input terminals 51 and 52 and generate a second voltage on node or line 77 that represents a predetermined portion of the input voltage at the drain terminal of the N-channel FET 53. The second voltage on node or line 77 is coupled through the second switch 106 to the second or positive input of the differential amplifier 80. Thus the ratio of the unregulated input voltage and the regulated output voltage drives differential amplifier 80 to produce an output on line 78 to the gate of N-channel FET 53 to regulate its impedance. A variation of the second voltage with respect to the first voltage caused by a variation of the voltage across the single pair of conductors connected to terminals 51 and 52 and the drain terminal of the N-channel FET 53 varies the impedance of the N-channel FET to present a low impedance to the single pair of input conductors 51 and 52. Thus the gate voltage of the N-channel FET 53 is varied by the output voltage of differential amplifier 80 to maintain the following DC relationship:

$$V_{IN}=V_1\times[1+(R_{70}/R_{72})]$$

where:

$V_{IN}$=the input signal voltage to the circuit on the single pair of conductors connected to terminals 51 and 52;

$V_1$=the first voltage produced by $V_{REG}$ and the first voltage divider network comprised of series connected resistors 102 and 104 such that $V_1=V_{REF}\times[R_{104}/(R_{102}+R_{104})]$; and $V_{REG}$=the substantially constant voltage at the output of the sense element 54 on node or line 98.

When the switches 106 and 108 are moved from their first position as shown to the second position, a high impedance is presented to the input terminals 51 and 52 by the circuit 42. In that case, a third voltage divider, formed by series coupled resistors 86 and 87, extends from the input to the current sensing element 54 on line or node 84 across the conductors coupled to terminal 51 to the second conductor input terminal 52 to generate a third voltage. This voltage is coupled by switch 108, in its second position, to the negative input of differential amplifier 80 while switch 106, in its second position, couples the first voltage on line or node 92 from the series coupled resistors 102 and 104 to the positive input of the differential amplifier 80. The output of the differential amplifier 80 on line 78 that is coupled to the gate of the N-channel FET 53 now causes the N-channel FET 53 to change its impedance from its first characteristic impedance to a second substantially higher impedance. Thus, as stated, the N-channel FET 53 with the voltage coupled to its gate from differential amplifier 80 and the circuits providing the input to the differential amplifier 80 form an impedance transformation circuit coupled across the single pair of first and second input conductors coupled to terminals 51 and 52 for changing the impedance of the circuit presented to the single pair of conductors on terminals 51 and 52.

The transceiver circuit 58 is old and well known in the art and will not be described in detail. However, it is necessary to filter, buffer, demodulate, accumulate and/or convert the digital information sent to it from other devices on the loop from serial to parallel form as needed. The transceiver circuit 58 may provide parallel-to-serial conversion, modulation, wave shaping (filtering) and/or coupling into the impedance control circuit for transmission purposes.

The analog input circuit 56 is also old and well known in the art and can be used for a multiplicity of useful functions. The one essential function in this application is to monitor the loop current through current sense element 54 as the primary means for the control system to indicate the desired output value to the pressure/position control algorithm as will be shown hereafter. Other functions for this analog input circuit 56 are monitoring of the output feedback sensor 50 for closed loop control, monitoring of electrical signals from a multiplicity of other local sensors as will be described hereafter or monitoring of the current or voltage in one or more auxiliary circuits externally connected via an additional conductor or conductors.

The microprocessor 59, which may be of any well-known type in the art, is the primary control element of the present invention. It may be implemented with separate processing and memory components or as a single chip microcontroller. It is required to decode and act upon digitally communicated information on the single pair of conductors 51 and 52 and to generate digital messages containing a response or providing request data for other devices. The microprocessor 59 may directly implement a control algorithm that drives an electro-pneumatic output stage 35 in response to either analog or digital information or it may simply provide a setpoint to an analog or pneumatic device which controls the output. A multiplicity of other functions may also be provided by the microprocessor such as autocalibration, temperature compensation and various control algorithms.

Figure 7:
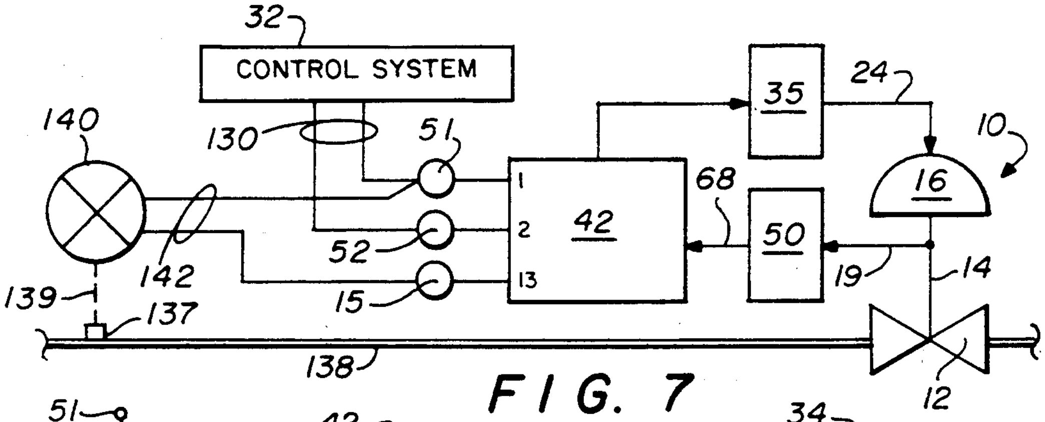

FIG. 7 discloses an alternate embodiment of the present invention that can be used to receive 4–20 milliamp analog DC signals over an additional pair of conductors 142 with digital signals being transmitted by and to the control system 32. In FIG. 7, devices such as a control valve 10 illustrated in FIG. 1 is shown schematically with the actuator 16 driving a stem or rod 14 to control the position of the valve 12. The change in position of valve 12 varies the flow of fluid in line or pipe 138 and may change other variables such as pressure and the like. As described earlier, in relation to the control system 32, a digital control signal is transmitted on the single pair of input lines 130 to terminals 51 and 52. The communication and control circuit 42 derives a setpoint signal that is coupled to the electro-pneumatic output stage 35. Stage 35 produces a pressure signal on line 24 to actuator 16 that moves rod 14 to position valve 12. The change in pressure on line 24 causes a feedback to unit 50 or the mechanical positioning of valve 12 causes a mechanical feedback by device 19 to the feedback unit 50. It converts the pneumatic or mechanical feedback into an electrical signal on line 68 to the communications and control circuit 42. The microprocessor 59 in communications and control circuit 42 may then convert that signal to a digital signal and transmit that signal back to the control system on the single pair of lines 130 to notify the control system of the new pressure or valve position.

Figure 8:
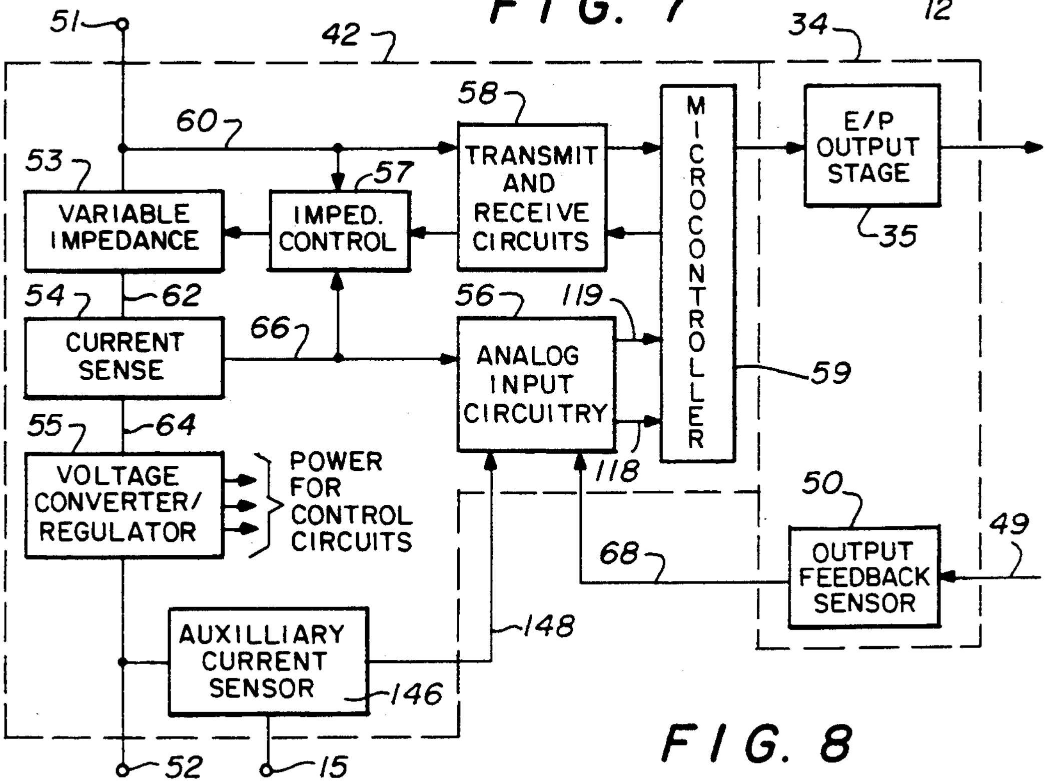
FIG. 8 is a simplified schematic diagram of a system using an auxiliary current sensor to receive the auxiliary analog input control signal of FIG. 7.

In addition, a two-conductor process transmitter 140 may be mechanically coupled to the line 138 to detect a second process variable such as pressure, temperature or the like by means of a sensor 137 coupled at 139 to process transmitter 140. It then develops an analog signal on a single pair of lines 142 that is coupled back to terminals 51 and 15. The current signal on terminals 51 and 15 is sensed by an auxiliary current sensor 146 as shown in FIG. 8 and is then coupled to the analog input circuitry 56 and to the microprocessor 59 as will be discussed in more detail in relation to FIGS. 8 and 9. The microprocessor 59 then reads the setpoint from the control system 32 and generates a servo-setpoint signal that is coupled to the electro-pneumatic output stage 35 for control of pressure or position depending upon whether the device is a transducer or positioner.

Further details of the system in FIG. 7 are illustrated in FIG. 8. The instrument of FIG. 8 uses the two terminals 51 and 52 to connect to the single pair of conductors 130 in FIG. 7 that go from the circuit 42 back to the process control system 32. Power is delivered to the instrument through the two conductors to terminals 51 and 52 in the form of a current and digital signals create the digital setpoint as described previously. The voltage converter/regulator 55 provides the regulated power to the instrument circuits. The digital signal at the two terminals 51 and 52 is communicated from the control room and serves as the initial control signal to the instrument. In the circuit shown in FIG. 8, the microcontroller 59 is used to provide the process control algorithm and a servo-algorithm. As stated earlier, analog servo-circuits external to the microcontroller 59 could also be used instead of a digital servo-algorithm. The output of the servo-algorithm in the microcontroller 59 is used to control the electro/pneumatic stage 35.

The output feedback sensor 50, which can be a pressure sensor for a transducer or a position sensor for a positioner, for example, generates a signal that is coupled back to the analog input circuitry 56 and is used to generate an error signal in the servo-algorithm in the microcontroller 59 and to communicate the feedback value, independent of the servo-algorithm. This device allows reception or transmission of digital communication simultaneously with the powering of the device over the two conductors 51 and 52. The microcontroller 59, connected to the transmit-and-receive circuit 58, impedance control device 57 and the variable impedance device 53 is used to produce a digitally encoded current or voltage signal at terminals 51 and 52 which has an average value of zero. To receive digital data, the instrument uses transmit-and-receive circuit 58 to receive the digitally encoded current signals at terminals 51 and 52 and provides the proper levels for input to the microcontroller 59 where it is decoded.

An auxiliary current sensor 146 is shown in FIG. 8 to sense the auxiliary variable input DC current such as from the two-conductor process transmitter 140 on single pair of lines 142 in FIG. 7. This current is used as the feedback to a process algorithm contained within the microcontroller 59. The process transmitter 140 in FIG. 7 may sense pressure, temperature, flow or some other process related variable and its single pair of conductors 142 is connected to the terminals 51 and 15. A variable DC current controlled by the transmitter 140 and representing the process variable is sensed by the auxiliary current sensor 146 in FIG. 8. The operation of the microcontroller 59 on the current sensed by sensor 146 is illustrated in more detail in FIG. 9.

Figure 9:
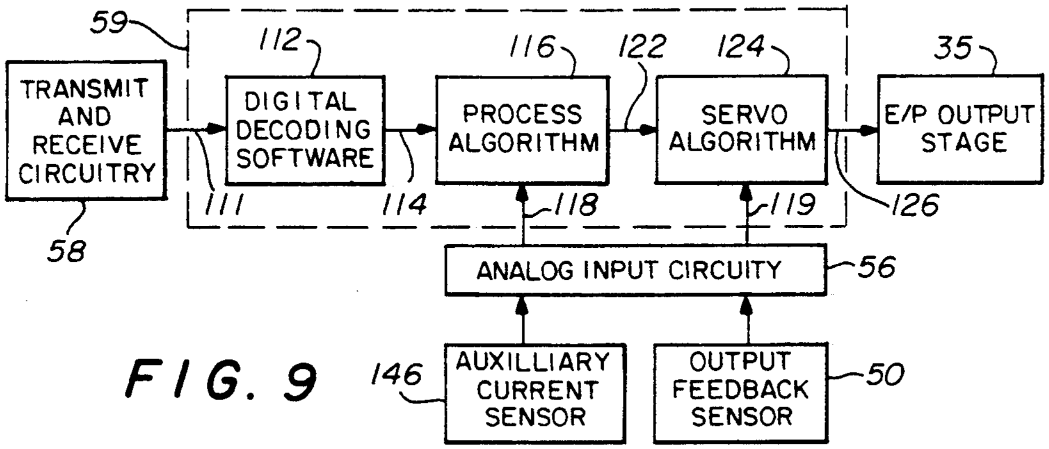
FIG. 9 is a block diagram of the system illustrating the instrument control functions with the addition of the auxiliary current sensor circuit.

In the embodiment of FIG. 9, the output from the auxiliary current sensor 146 is connected to the analog input circuitry 56 as shown in FIG. 8 and then to the microprocessor 59. Inside the microprocessor 59, this auxiliary signal becomes the process feedback signal to a process algorithm 116 where it is compared to the digitally derived setpoint 114 coming from the digital decoding software 112. Transmit and receive circuitry 58 in the circuit 42 (in FIG. 7) receives the digital signal on the single pair of conductors and couples it to software 112 which decodes it for the microcontroller 59 as described previously to establish the setpoint 114. The process algorithm 116 generates a new servo-setpoint 122 for the servo-algorithm 124 by comparing the set point 114 with the data from the process transmitter 140. The servo-setpoint 122 is then compared to the output signal from feedback sensor 50 through the analog input circuitry 56. Servo-algorithm 124 then generates a correction on line 126 to the electro/pneumatic output stage 35 for control of the instrument output pressure where the control device is a transducer or for a control of a valve position where the control device is a positioner. In an alternate embodiment, the process or servo-algorithms 116 and 124 may be analog circuits that the microcontroller 59 supervises in a well-known manner. The system shown in FIGS. 8 and 9, as stated earlier, can also be used to transmit and receive digital signals to and from the control room 32 over terminals 51 and 52 as well as to receive the analog signals from the current sensor 146 as described previously.

Thus, in FIGS. 7, 8 and 9, an auxiliary transducer or sensor 137 is responsive to the operation of the device 12, such as a control valve, for sensing an auxiliary function such as temperature, pressure, flow and the like process related variables and generating a corresponding DC output electrical signal. A process transmitter 140 is coupled at 139 to the auxiliary transducer 137 for generating a DC output current on a second single pair of third and fourth conductors 142 to first and third input terminals 51 and 15, respectively, of the communication and control circuit 42. An auxiliary current sensing device 146 has one input coupled to the first terminal 51 and a second input coupled to the third terminal 15 for generating an output signal representative of the DC output electrical signal from process transmitter 140 which represents the output of auxiliary transducer or sensor 137. The output of sensing device 146 is coupled to the analog circuit 56 such that a second output of the analog circuit 56 is coupled to the microcontroller 59 as a feedback signal for control purposes as described previously. Reviewing FIG. 9, the first process algorithm 116 may be a first comparator means in the microcontroller 59 for comparing the input control signal 114 from the single pair of input conductors on terminals 51 and 52 with the first output of the analog circuit 56 from the auxiliary current sensor 146 to establish a first corrected control signal 122 and the servo-algorithm 124 may be a second comparator means in the microcontroller 59 for comparing the first corrected control signal or servo-setpoint signal 122 with the second output of the analog circuit 56 from the output feedback sensor 50 to establish a second corrected servo-control signal 126 that is coupled to and controls the electro/pneumatic output stage 35.

Figure 10:
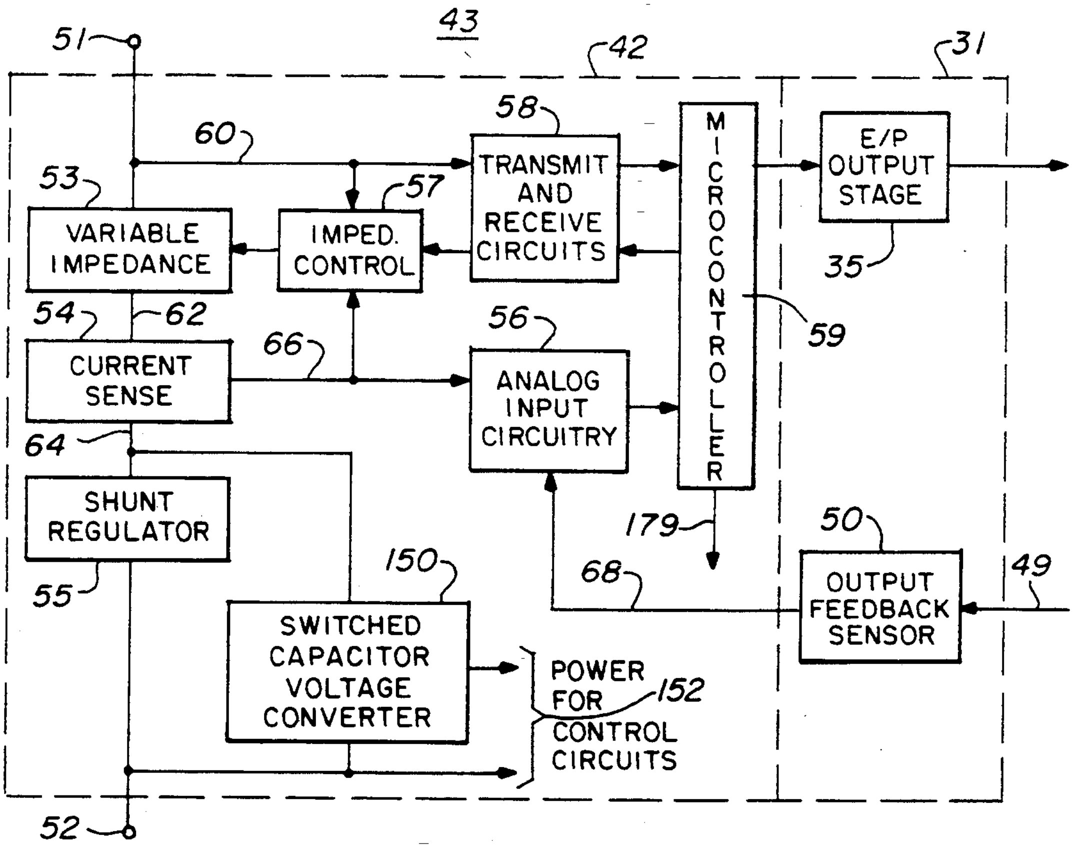
FIG. 10 is a block diagram of the present invention further including a switched capacitor voltage converter to provide power for the control circuits.

As can be seen in the circuit of FIG. 10, a switched capacitor voltage converter 150 has been added in parallel with the shunt regulator 55 to provide power on terminals 152 for the control circuits. The remainder of the circuit functions as set forth previously. The details of the shunt regulator 55 and the switch capacitor voltage converter 150 are disclosed in FIG. 11.

Figure 11:
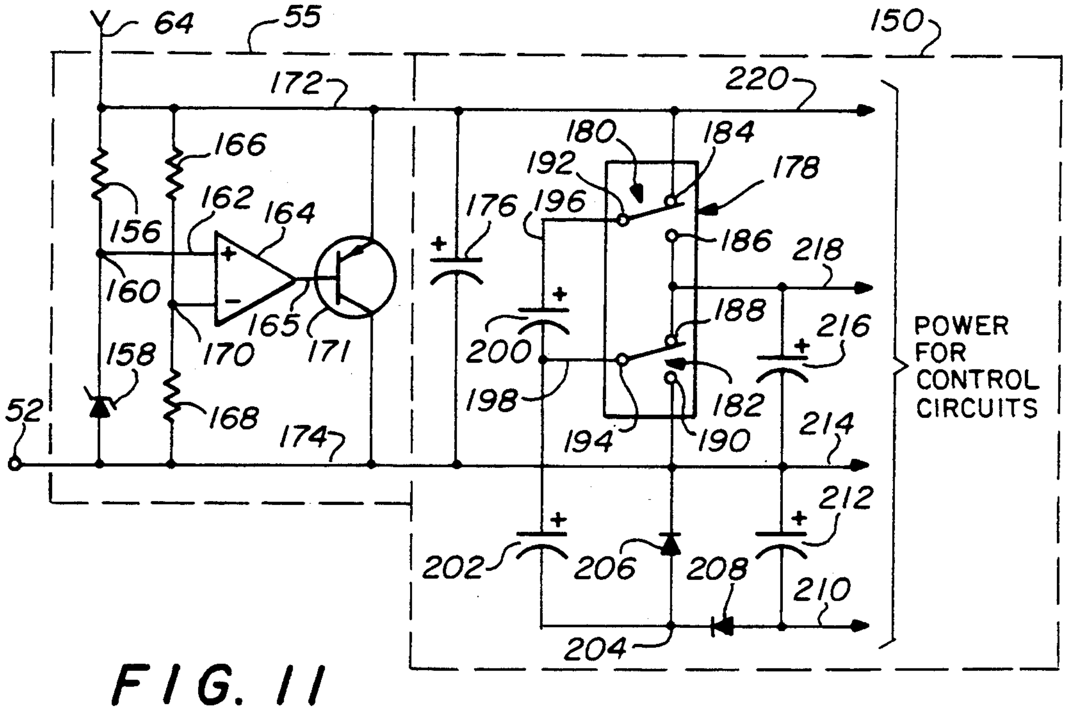
FIG. 11 is a detailed schematic circuit diagram of the switched capacitor voltage converter and shunt regulator.

Shunt regulator 55 is the internal power supply voltage regulator. It provides a substantially constant voltage at node 172 with respect to a common or ground node 174 (in FIG. 11) over the full range of loop current with a varying current load from other connected circuitry. Any excess current flowing in the loop, not required for powering the control circuitry, is simply shunted by the PNP transistor 171 coupled across nodes 172 and 174. The function of the shunt transistor 171 could be provided by other circuits such as a zener diode, a commonly available shunt regulator integrated circuit, or a transistor circuit. In the circuit 55 as shown in FIG. 11, the supply current from current sensor 54 on line 64 is coupled to node 172. Resistor 156 provides a reverse excitation current to zener diode 158 which provides a voltage reference, $V_{REF}$ at node 160 to line 162 and to the noninverting input of operational amplifier 164. The other input to the amplifier 164 is derived from the series resistor combination 166 and 168 across nodes 172 and 174 such that any variation in the voltage at 172 causes a variation at node 170. Amplifier 164 drives the base of PNP transistor 171 to regulate the voltage at node 172 according to the following equation:

$$V_{IN}=V_{REF}\times(1+R_{166}/R_{168})$$

where:

$V_{IN}$ is the regulated voltage at 172, $V_{REF}$ is the reference voltage at 160, and $R_{166}/R_{168}$ are fixed values chosen to provide the desired regulated voltage, $V_{REG}$, given a chosen $V_{REF}$.

Thus, the voltage regulator includes a current shunting element 171 across the single pair of conductors connected to input terminals 51 and 52 for shunting any excess current flowing in the two conductors and not required for powering the circuit. The current shunting element comprises a substantially constant voltage node 172 having a voltage, $V_{IN}$, formed at the output of the current sensor 54 with respect to terminal 52. An operational amplifier 164 has first and second inputs 162 and 170, respectively, and an output to the base of the shunting transistor 171. A circuit, including resistor 156 and series coupled zener diode 158 has node 160 coupled to the first input of the amplifier 164 on line 162. A series circuit formed of resistors 166 and 168 is connected across the input terminals 51 and 52 and couples the voltage developed across resistor 168 to the second input of the operational amplifier 164 on line 170. Transistor 171 has its emitter and collector coupled across the nodes 172 and 174, which is coupled across the single pair of conductors to input terminals 51 and 52. The output of the operational amplifier 164 is coupled to the base of the transistor 171 such that the voltage of the substantially constant voltage node 172 is regulated according to the equation:

$$V_{IN}=V_{REF}\times[1+(R_1/R_2)].$$

The output of the voltage regulator at nodes 172 and 174 is coupled to the switched capacitor voltage converter 150 for developing a voltage of substantially $V_{IN}$, $V_{IN}/2$ and $-V_{IN}/2$. Capacitor 176 across the input lines 172 and 174 to the switched capacitor voltage converter 150 filters the regulated voltage on line 172 that is being coupled to the switched capacitor voltage converter 150. Voltage converter 150 is comprised of a switching device 178 which is well known in the art and added circuitry that generates an additional output.

Capacitors 176, 200 and 216 work in conjunction with switching device 178 in a manner that is well known and completely described in application notes for commercially available switched capacitor voltage converter integrated circuits to produce a voltage at 218 that is essentially one-half the input voltage at 220 with respect to 214.

Capacitors 202 and 212 and diodes 206 and 208 form a charge pump circuit which is also common and well known in the art.

Node 198 as a normal function of the switched capacitor voltage converter 178 is alternately connected to nodes 218 and 214. This alternating connection produces an AC signal that is readily converted to a negative voltage by the charge pump circuit. The output of the charge pump circuit as shown will be negative with respect to node 214 and will have a magnitude approximately equal to the output of device 178 less the forward voltage drops of diodes 206 and 208.

The novelty of voltage conversion circuit 150 is the unique combination of the two known arts of a switched capacitor voltage converter and a charge pump to produce a multiple output highly efficient power supply which is uniquely applied to a two-conductor 4–20 milliamp controlled device. Thus it can be seen that the novel instrument 43 communicates with a control system from a remote location with both digital and DC control signals for driving an actuator. The circuit 42 comprises first and second input terminals 51 and 52 for receiving both 4–20 milliamp variable DC analog control signals and digital communication control signals on the same two input terminals 51 and 52. The remote instrument 43 includes the circuit 42 that converts the input control signals to actuator drive pressures. Pneumatic tubing couples the output driving pressure to the actuator 16 as shown in FIG. 3 in response to the input digital or DC control signals. The remote instrument 43 receives instrument and actuator condition signals, converts them to digital signals and couples the digital signals to the first and second terminals 51 and 52 for transmission to the control system 32 on the single pair of conductors and further receives digital communication signals from the control room and generates pneumatic drive signals to the actuator.

Thus, there has been disclosed a novel remote instrument allowing communication between a control system and the input terminals of the instrument over a single two-conductor pair with both variable DC analog control signals and digital communications such that the control system can not only control the instrument but can also receive information from to the instrument related to diagnostics of the device or the actuator for transmission to the controller. The diagnostics relate to operational data associated with the device or the actuator such as temperature, pressure, position and the like. Thus, a single pair of conductors allows both DC controlled and digitally controlled diagnostic routines of the instrument to be performed.

There has also been disclosed a novel impedance transformation circuit used by the system and coupled to the single pair of first and second input conductors for presenting a characteristic impedance to the single pair of conductors to enable both analog signal communication at low impedances and digital communication at high impedances as needed.

Further, there has been disclosed a novel circuit for accepting an auxiliary analog input that can be used as a feedback to a process control algorithm contained within the communication system. The auxiliary input DC current may be from a process transmitter sensing pressure, temperature, flow or some other process related variable. The novel instrument can also be used to transmit to and receive digital signals from the control room as well as to receive the transmission of the analog signals from the auxiliary process transmitter by using a variable impedance and auxiliary current sensing device.

Finally, there has been disclosed a novel voltage regulator and switched capacitor voltage converter for accepting a level of DC current from 4–20 milliamps with a minimum DC voltage at its input terminals and providing a regulated output voltage that is stepped down for use with the communication, monitoring and control circuitry.

Thus, the invention combines a low voltage microprocessor with switched capacitor voltage conversion and a novel variable impedance characteristic to meet the requirements for the 4–20 DC milliamp operation and with bidirectional digital communication on a single pair of conductors.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A system for communicating between a control system and a remote instrument, the system comprising:

a single pair of first and second conductors coupled between the control system and the remote instrument for carrying variable analog DC control signals to the remote instrument to cause the remote instrument to perform selective tasks; and a communication circuit forming part of the remote instrument having first and second input terminals coupled to the single pair of first and second conductors and having an output coupled to an operating device for selectively coupling the variable analog DC control signals to the operating device and simultaneously enabling bidirectional digitally encoded communication signals concerning supplemental data to be transmitted between the first and second input terminals and the control system over said single pair of first and second conductors.

2. A system as in claim 1 wherein the communication circuit is located at the site of the operating device and controls the operating device.

3. A system as in claim 2 wherein the circuit is located on the operating device and is a part of the operating device.

4. A system as in claim 3 wherein:

the DC control signals range from 4–20 milliamps at input terminals of said remote instrument; and the digitally encoded communication signals have a frequency band of substantially 500–5000 Hz.

5. A system as in claim 1 wherein the instrument includes:

a variable impedance line interface element; and impedance control means coupled to the variable impedance line interface element for providing a first impedance for the variable analog DC control signals and a second substantially higher and relatively constant impedance for receiving the digitally encoded communication signals from the control system.

6. A system as in claim 5 wherein:

the analog DC control signals range from 4–20 milliamps at input terminals of said remote instrument having a first frequency; and the digitally encoded communication signals have a second substantially higher frequencies with a frequency band of substantially 500–5000 Hz.

7. A system as in claim 6 wherein the communication circuit includes:

a transceiver coupled to the first and second input terminals for receiving the digitally encoded communication signals from the control system on the single pair of first and second conductors at the second substantially higher frequencies by decoding, filtering, buffering, demodulating, accumulating and converting digital information of the digitally encoded communication signals on the single pair of conductors from serial to parallel;

the transceiver serially transmitting said digital information to the control system by converting, modulating and wave shaping and coupling the digitally encoded communication signals to the impedance control means; and the impedance control means controlling the first and second impedance with the variable impedance element to affect a terminal voltage or a loop current of the single pair of conductors coupled to said first and second input terminals for both the variable DC and the second substantially higher frequencies for digital communications.

8. A system as in claim 7 further comprising:

an actuator coupled to the operating device;

a current sensor element coupled in series with the first input terminal; and an analog input circuitry coupled to the current sensor element to extract the DC analog input control signals from said single pair of first and second conductors to provide a desired output from the remote instrument.

9. A system as in claim 8 further comprising:

electrical conductors coupling actuator feedback signals from an output feedback sensor to the analog input circuitry for monitoring physical properties of position, temperature, flow or pressure for use within the instrument and for digital transmission to the control system on said single pair of first and second conductors at the second frequencies; and a microcontroller circuit coupled to the analog input circuitry and the transceiver to receive the analog control signals on said single pair of first and second conductors at the first variable frequency of the analog DC control signals and to process the digitally encoded communication signals received on said single pair of first and second conductors at the second substantially higher frequencies and to transmit digitally encoded communication signals on said single pair of first and second conductors to the control system representing other information pertaining to or contained within the remote instrument and the actuator.

10. A system as in claim 8 wherein the variable line interface element comprises:

at least one semiconductor element having input, output and control terminals with the input and output terminals coupled to the first input terminal; and said impedance control means coupled to the control terminal of the at least one semiconductor element to provide a desired impedance characteristic.

11. A system as in claim 10 wherein:

said at least one semiconductor element comprises an N-channel FET having a source, drain and gate terminals with said drain and said source in series with the first input terminal; and the impedance control element means being coupled to the gate terminal of the N-channel FET to provide the desired impedance characteristic.

12. A system as in claim 11 wherein the current sensor element comprises a resistor coupled in series with the source and drain terminals of the N-channel FET to provide current sensing for both controlling the impedance at the variable impedance element and for sensing the 4–20 milliamps of analog DC signals.

13. A system as in claim 12 further comprising:

a voltage regulator coupled across the single pair of conductors coupled to the input terminals at an output of the current sensor element to provide a substantially constant regulated voltage, $V_N$, across the single pair of conductors over the full range of the loop current and with a varying input current load.

14. A system as in claim 13 wherein the impedance control means comprises:

a differential amplifier having first (−) and second (+) voltage inputs and a voltage output;

an electrical connection between the voltage output of the differential amplifier and the gate of the N-channel FET to vary the impedance of the N-channel FET;

a first voltage divider across the input terminals having the substantially constant regulated voltage for generating a first voltage ($R_{102}/R_{104}$) representing a predetermined portion of the regulated voltage, the first voltage being coupled by a first conductor to the first input of the differential amplifier;

a second voltage divider across the input terminals for generating a second voltage ($R_{70}/R_{72}$) representing a predetermined portion of an input voltage at the drain terminal of the N-channel FET, the second voltage being coupled by a second conductor to the second input of the differential amplifier; and the voltage output of the differential amplifier being coupled to the gate of the N-channel FET such that a variation of the second voltage with respect to the first voltage caused by the variations of the loop current varies the impedance of the N-channel FET.

15. A system as in claim 14 wherein:

the voltage of the gate of the N-channel FET is varied by the voltage output of differential amplifier to maintain the following relationship:

$$V_{IN}=V_1\times(1+R_{70}/R_{72})$$

where:

$V_{IN}$=the input signal voltage to the circuit on the single pair of conductors connected to terminals;

$V_1$=the first voltage produced by $V_{REG}$ and the first voltage divider comprised of series connected resistors such that $V_1=V_{REF}\times(R_{104}/R_{102}+R_{104})$; and $V_{REG}$=the substantially constant voltage at the output of the sense element.

16. A system as in claim 15 further comprising:

a third voltage divider extending from an input of the current sensor element across the input terminals to generate a third voltage; and switch means coupled to the first, second and third voltages and to the differential amplifier for causing the N-channel FET to change the impedance characteristic from said first impedance to said second substantially higher impedance.

17. A system as in claim 16 wherein the switch means comprises:

first and second mechanically coupled switches;

the first switch having a first position for coupling the first voltage to the first input (−) of the differential amplifier;

the second switch having a first position for coupling the second voltage to the second input (+) of the differential amplifier to cause the N-channel FET to have said first impedance;

the first switch having a second position for coupling the third voltage to the first input (−) of the differential amplifier; and the second switch having a second position for coupling the first voltage to the second input (+) of the differential amplifier to cause the N-channel FET to have said second impedance.

18. A system as in claim 17 further comprising a capacitor coupled form the input of the current sensor element to the first input (−) of the differential amplifier to couple the voltage across the current sensor element to the differential amplifier so as to oppose changes in the current of an input signal of said system and increase the impedance across the second substantially higher frequency band.

19. A system as in claim 18 further comprising:

a second capacitor coupled between the substantially constant voltage caused by the voltage regulator and the second input (+) of the differential amplifier; and a third capacitor coupled between the source terminal of the N-channel FET and the first position of the second switch such that only when the second switch is in the first position, the second impedance caused by the N-channel FET levels off at a relatively fixed value above a predetermined cut-off frequency for limiting signal distortion.

20. A system as in claim 13 wherein said voltage regulator further includes a current shunting element across said single pair of first and second conductors for shunting any excess current flowing in the pair of conductors, and not required for powering the system, from of said conductors to the other.

21. A system as in claim 20 wherein the current shunting element comprises:

a common node and a substantially constant voltage node having the regulated voltage $V_N$ formed at the output of the current sensor element on the first conductor with respect to the second conductor;

an operational amplifier having first and second inputs and an output;

a first circuit having an output coupled to the first input (+) of the amplifier for providing a reference voltage, $V_{REF}$;

first and second series coupled resistors, $R_1$ and $R_2$, respectively, coupled across the common node and the constant voltage node and coupling the voltage at the voltage node across the second resistor to the second input (−) of the operational amplifier 164;

a transistor having a base, emitter and collector with the emitter and collector coupled across the common node and the constant voltage node; and the output of the operational amplifier being coupled to the base of the transistor such that the voltage, $V_N$, at the substantially constant voltage node is regulated according to the equation:

$$V_N=V_{REF}\times(1+R_1/R_2).$$

22. A system as in claim 21 wherein the first circuit for providing the reference voltage, $V_{REF}$, comprises:

a resistor and zener diode coupled in series across the common node and the constant voltage node; and a voltage of said output of said first circuit developed across the zener diode being coupled to the first input of the operational amplifier as the reference voltage, $V_{REF}$.

23. A system as in claim 13 further including:

a voltage converter coupled to the voltage regulator for receiving the substantially constant voltage, $V_N$, on the first conductor and developing a first output voltage of substantially $V_N/2$ at a first terminal and a second output voltage of substantially $-V_N/2$ at a second terminal.

24. A system as in claim 13 further comprising a switched capacitor voltage converter coupled to the voltage regulator for receiving the regulated voltage, $V_N$, and providing output voltages, $V_N/2$ and $-V_N/2$.

25. A system as in claim 8 further comprising:

a feedback sensor circuit coupled to the actuator for generating signals for a closed loop control of the actuator;

conductor means for coupling the feedback sensor circuit to the analog input circuitry; and a microprocessor coupled to the transceiver and said analog input circuitry for receiving feedback signals from the analog input circuitry and completing the closed loop.

26. A system as in claim 8 further comprising:

an auxiliary sensor responsive to the operation of the actuator for sensing an auxiliary function of temperature, or flow, and generating a corresponding output electrical current signal;

a process transmitter coupled to the auxiliary sensor for generating a variable DC output signal on a second single pair of third and fourth conductors;

a third input terminal on the communication circuit coupled to the analog input circuitry; and an auxiliary current sensing device having first and second inputs and an output coupled to the analog input circuitry, the first input of said sensing device being coupled to the first terminal and the second input of said sensing device being coupled to the third terminal of said communication circuit for generating an output signal to the analog input circuitry such that a second output of the analog input circuitry is coupled to a microprocessor as a feedback signal.

27. A system as in claim 26 further comprising:

the microprocessor for processing information from the transceiver and generating an input control signal;

a first comparator means in the microprocessor for comparing the input control signal, as a setpoint from said transceiver, with the second output of the analog circuit to establish a first corrected control signal; and a second comparator means in the microprocessor for comparing the first corrected control signal with a first output of the analog circuit to establish a second corrected control signal that is coupled to and controls the operating device.

28. A system as in claim 27 wherein:

the first comparator means is a process algorithm; and the second comparator means is a servo-algorithm.

29. A system as in claim 27 wherein:

the first comparator means is a first analog comparator; and the second comparator means is a second analog comparator.

30. A system as in claim 1 wherein the digitally encoded communication signals produce a voltage that has an average value of zero across the single pair of conductors.

31. An instrument for communicating with a control system through only a single pair of first and second conductors from a remote location by simultaneously receiving variable analog DC input control signals, and receiving or transmitting digital control signals so as to drive an actuator, the instrument comprising:

first and second input terminals for receiving both the 4–20 milliamps of the variable DC analog input control signals, and receiving and transmitting bidirectional digital communication signals on the input terminals;

circuit means for converting said analog DC input control signals to actuator drive signals;

actuator responsive signals coupled to the circuit means for acknowledging the actuator responses to the actuator drive signals; and digital signal processing means coupled to the first and second terminals to allow both transmission of digital information signals relating to the instrument and the actuator to the control system on said single pair of conductors and reception of digital command signals from the control system.

32. An instrument as in claim 31 further including:

a variable impedance element coupled to the first and second input terminals; and an impedance controller coupled to the variable impedance element to vary the input impedance of the instrument according to the analog control signals and the digital signals being received or transmitted.

33. An instrument as in claim 32 wherein the digital signal processing means includes a microprocessor coupled to the transceiver for processing received said digital or DC signals, interrogating the actuator according to the received digital or DC signals to obtain a desired actuator condition and generating corresponding digital signals for transmission to the control system.

34. An instrument as in claim 33 further including:

a current sensor element coupled in series with one of the single pair of conductors and having an input and an output; and an analog circuit coupled to the output of the current sense element to extract the DC analog control signals from the single pair of conductors to provide a desired output signal to the actuator.

35. An instrument as in claim 34, said instrument being associated with an auxiliary sensor and further including:

a voltage regulator for maintaining a substantially constant voltage; and an auxiliary current sensing element coupled to the auxiliary sensor for detecting condition signals representative of the auxiliary sensor and coupling them to the microprocessor as a feedback control signal.

36. An instrument as in claim 35 further including:

a third input terminal;

a two-conductor processor transmitter generating signals that are coupled to the first and third input terminals;

the auxiliary current sensor sensing the signals from the two-conductor process transmitter and coupling the signals to the microprocessor; and the microprocessor being used to process and store the signals received from the auxiliary current sensor.

37. An instrument as in claim 31 further including a transducer for generating said actuator responsive signals.

38. A voltage regulator for developing a substantially constant voltage between first and second conductors and comprising:

the first and second conductors receiving an input current;

an operational amplifier having first (−) and second (+) inputs and an output;

a circuit coupled between the first and second conductors and generating an output to the first input (−) of the amplifier as a reference voltage, $V_{REF}$;

first and second series coupled resistors, $R_1$ and $R_2$, connected across the first and second conductors and coupling the voltage across the second resistor, $R_2$, to the second input (+) of the amplifier;

a transistor having a base, emitter and collector with the emitter and collector coupled across the first and second conductors; and the output of the operational amplifier being coupled to the base of the transistor such that a voltage, $V_N$, on the first conductor is a substantially constant voltage regulated according to the equation:

$$V_N = V_{REF} \times (1 + R_1/R_2).$$

39. A voltage regulator as in claim 38 wherein the circuit for providing a reference voltage, $V_{REF}$, comprises:

a resistor and a zener diode coupled in series across the single pair of first and second conductors; and the voltage developed across the zener diode being coupled to the first input of the operational amplifier as the reference voltage.

40. An impedance transformation circuit coupled to a single pair of first and second input conductors carrying either a variable DC analog signal or a digital signal for changing its impedance as presented to the single pair of conductors from a first impedance for the DC analog signal to a second substantially higher impedance for the digital signal, the circuit comprising:

a variable impedance element coupled between the first and second input conductors;

impedance control means coupled to the variable impedance element for causing the variable impedance element to present the first impedance to the single pair of conductors for the DC analog signal and the second substantially higher impedance for the digital signal; and switch means coupled to the first input conductor and the impedance control means and having first and second positions such that in the first position the variable impedance presents the first impedance and in the second position presents the second substantially higher impedance to the single pair of conductors.

41. A circuit as in claim 40 wherein the variable impedance element comprises:

at least one semiconductor element having input, output and control terminals with said input and output terminals coupled to the single pair of conductors; and the impedance control means having an input coupled to the switch means and having an output coupled to the control terminal of the at least one semiconductor element to provide the first and second impedance.

42. A circuit as in claim 41 wherein:

the at least one semiconductor element comprises an N-channel FET having a source, drain and gate terminals with said drain and said source terminals in series with one of the single pair of conductors; and the impedance control element means having its output coupled to the gate of the N-channel FET to provide the device impedance.

* * * * *

UNITED STATES PATENT AND TRADEMARK OFFICE

CERTIFICATE OF CORRECTION

PATENT NO. : 5,451,923

DATED : September 19, 1995

INVENTOR(S) : STEPHEN G. SEBERGER, ET AL.

It is certified that error appears in the above-indentified patent and that said Letters Patent is hereby corrected as shown below:

Col. 1, line 57, before "transmitters" insert --process--.

Col. 6, line 9, delete "transducer" and insert --instrument--.

Col. 7, line 20, delete "instrument 34" and add --instrument 43--.

Col. 13, line 18, after "algorithm." begin a new paragraph with "This device".

Col. 16, line 32, after "information from" delete "to".

UNITED STATES PATENT AND TRADEMARK OFFICE

CERTIFICATE OF CORRECTION

PATENT NO. : 5,451,923

DATED : September 19, 1995

INVENTOR(S) : STEPHEN G. SEBERGER, ET AL

It is certified that error appears in the above-indentified patent and that said Letters Patent is hereby corrected as shown below:

IN THE CLAIMS:

(Claim 9, line 18),
Col. 18, line 39, after "transmit" insert --the--.

Signed and Sealed this

Second Day of September, 1997

Attest:

BRUCE LEHMAN

Attesting Officer

*Commissioner of Patents and Trademarks*